United States Patent
Hashizume et al.

[11] Patent Number: 6,118,631
[45] Date of Patent: Sep. 12, 2000

[54] TAPE CASSETTE

[75] Inventors: Kenji Hashizume, Miyota-machi; Hiroshi Kaneda, Asashina-mura; Masatoshi Okamura, Saku, all of Japan

[73] Assignee: TDK Corporation, Tokyo, Japan

[21] Appl. No.: 09/176,883

[22] Filed: Oct. 22, 1998

[30] Foreign Application Priority Data

Oct. 24, 1997 [JP] Japan ................................ 9-309526

[51] Int. Cl.[7] .................................................. G11B 23/087
[52] U.S. Cl. ............................................................ 360/132
[58] Field of Search .......................... 360/132; 242/347.1

[56] References Cited

U.S. PATENT DOCUMENTS

| | | | |
|---|---|---|---|
| 3,900,172 | 8/1975 | Kamaya | 242/198 |
| 4,951,167 | 8/1990 | Hiramoto et al. | 360/132 |
| 5,308,015 | 5/1994 | Gelardi et al. | 242/199 |

FOREIGN PATENT DOCUMENTS

| | | |
|---|---|---|
| 147513 | 7/1985 | European Pat. Off. . |
| 287664 | 10/1988 | European Pat. Off. . |
| 3331160 | 3/1985 | Germany . |
| 713109 | of 0000 | Japan . |
| 2068334 | 8/1981 | United Kingdom . |
| 2187711 | 9/1987 | United Kingdom . |

*Primary Examiner*—Robert S. Tupper
*Attorney, Agent, or Firm*—Baker Botts L.L.P.

[57] ABSTRACT

In a tape cassette comprising a housing made up of upper and lower casings, a pair of reels around which a tape is wound and contained altogether in the housing, the housing having openings formed at the front so that the tape supplied from one reel travels as exposed along the front and is taken up by the other reel, a front lid swingably attached to the housing to cover its front surface, and a spring member having a coiled portion fitted onto a pivot of the front lid and also having a free end secured to the inner surface of the upper casing to force the front lid in the closing direction by the spring action; a bend angled toward a direction away from the inner surface of the upper casing is formed at the free end of the spring member that applies the spring action to the front lid, and a rib to secure the free end of the spring member in place is formed at the front of the upper casing to which the front lid is attached.

2 Claims, 7 Drawing Sheets

TAPE CASSETTE

BACKGROUND OF THE INVENTION

1. Field of the Invention

This invention relates to a tape cassette and, more particularly to a tape cassette provided with a front lid which covers the front of the cassette housing and a spring member which by the spring action forces the front lid in its closing direction.

2. Description of the Prior Art

Figure 6A:
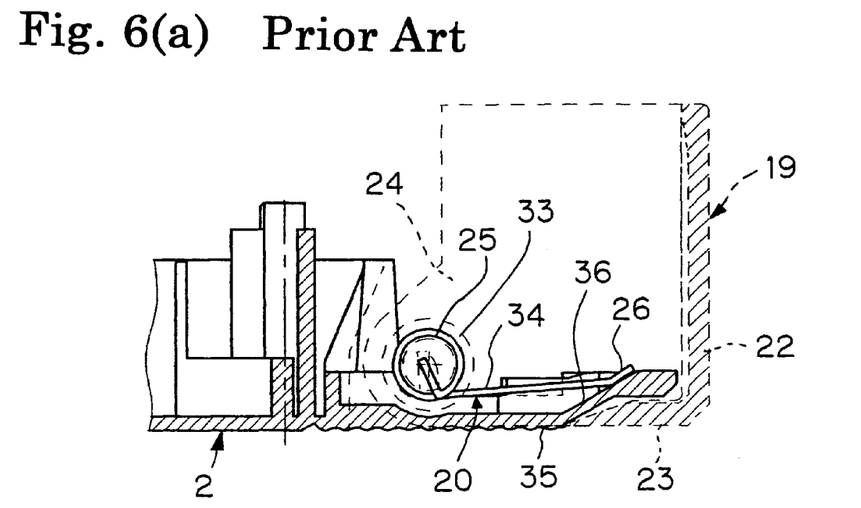
Figure 6B:
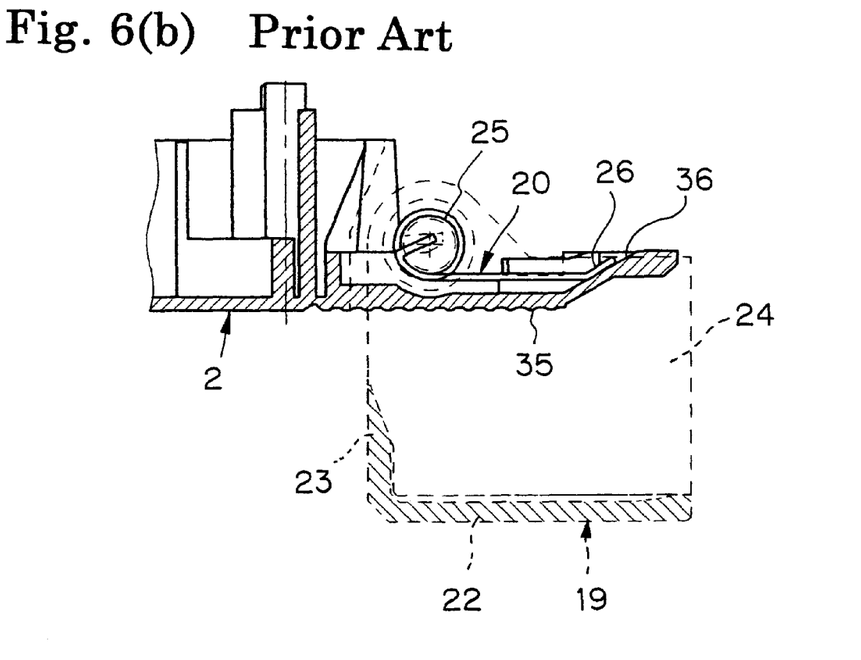
Figure 7A:
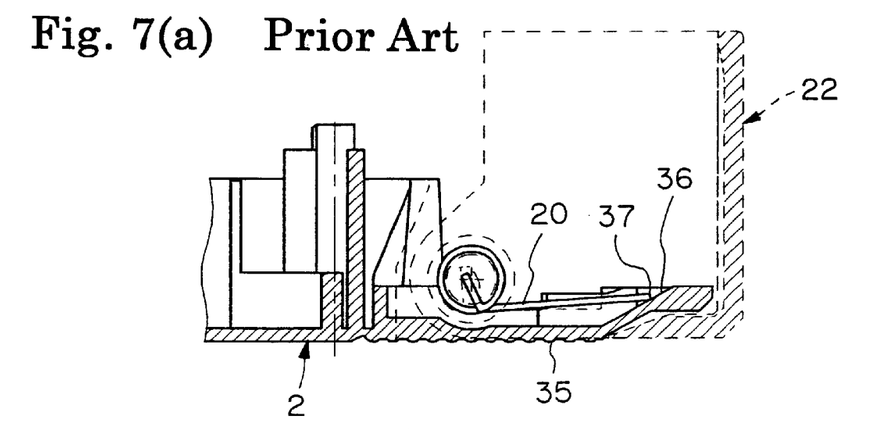
Figure 7B:
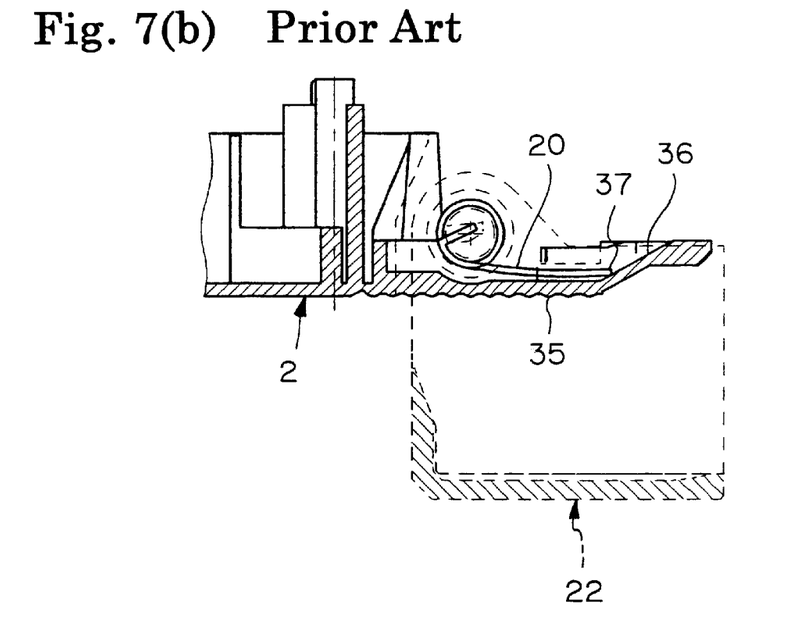

Tape cassettes provided with a front lid which covers the open front of the cassette housing and a spring member which by the spring action forces the front lid in its closing direction are in wide use. For ease of fitting such a spring member in a cassette housing, the spring member is first set in a front lid, and the spring-loaded lid is temporarily connected to an upper half casing of the housing. Meanwhile reels and other components are assembled in a lower half casing in advance. The upper casing with the front lid kept open against the action of the spring member is fitted to the lower casing and joined securely, and finally the front lid is released by the spring member to the closing position. Japanese Utility Model Kokoku No. 7-13109 proposes a design in which a pivot of a front lid is equipped with a coiled spring while an upper half casing is provided with a guide rib for guiding a free end of a spring member, so that a leg of the coiled spring is guided by the guide rib to facilitate the fitting of the spring means in place and preclude the possibility of the free end of the spring member being disengaged from its receiving part. FIGS. 6 and 7 illustrate two typical prior art structures and methods of assembling these components.

FIG. 6 depicts a conventional structure, (a) showing a front lid fitted to an upper casing, and (b) the front lid swung open to set the casing to a lower casing. The upper casing is then turned upside down and fitted to the lower casing. The procedure will now be explained in detail. The front lid 19 is generally L-shaped, consisting of a top strip 23 and a front strip 22, with sidewalls 24, 24 on both sides. The sidewalls 24 are formed in one piece with pivots 25, one for each. A coiled portion 33 of a spring member 20 is secured to one of the pivots 25, and a leg 34 of the spring member having a bend 26 at the end is hooked on the inside of the top strip 23 of the front lid 19. The upper casing 2 has retaining ribs for positioning the pivots 25, formed on the inner side (underside) of the front top wall 35 of the casing. Also a recess 36 is formed on the underside of the front top wall 35 to receive the leg at the free end of the spring member 20. The retaining ribs are adapted to be combined with corresponding retaining ribs of the lower casing to provide bearings for turnably supporting the pivots 25. When the front lid 19 thus fitted with the spring member 20 is to be set to the upper casing 2, the pivot 25 at the end where it is not loaded with the spring member 20 is first fitted to the upper casing 2. Next, the top wall 35 of the upper casing 2 is caused to slide into the space between the spring-loaded pivot 25 and the leg 34 at the free end of the spring member, and both pivots 25 are brought into contact with the retaining ribs. The leg 34 of the spring member 20 that had been caught in the top strip 23 is thus engaged with the recess 36 of the upper casing 2. The temporarily assembled state is shown in FIG. 6(a).

Next, the upper casing 2 with the front lid 19 attached is put on and joined with the lower casing (not shown; refer to the lower casing 1 in FIG. 1 according to the present invention) in which reels 14 and other components have been fitted in place. Prior to the joining, the front lid 19 has to be swung and kept in the open position shown in FIG. 6(b) to avoid its interference with the tape in the lower casing. At this point the pivots 25 are not secured yet, and the front end of the leg of the spring member 20 that has the bend 26 provided to prevent scratching and biting into the upper casing tends to slip out of place, causing the front lid to come off depending on the direction of external force applicable to the lid during the matching of the upper casing with the lower casing.

FIG. 7 illustrates another structure of the prior art in (a) and (b) which correspond, respectively, to (a) and (b) of FIG. 6. Here a spring member 20 has no bend formed at its free end 37. Unlike that of FIG. 6, this structure does not allow the front lid to come off during assembling. However, when the front lid is swung to the position as shown in FIG. 7(b) for connection to the lower casing, a pivot 25 yet to be secured in place rises, retracting the free end 37 of the spring member as in FIG. 7(b). After the upper casing has been matched with the lower casing, the free end of the spring member bites into the wall of a recess 36 formed in the underside (inner surface) of the upper wall of the upper casing 2 and fails to return to the original position. This can result in malfunction of the front lid or, when the free end of the spring member returns to the original position somehow or other, it tends to scratch off the wall surface, producing enough scrap to cause a potential problem.

In the prior art arrangement illustrated in FIG. 6 the free end of the spring member is bent and easy to slide along the underside (inner surface) of the top wall 35 of the upper casing 2. This causes a problem of frequent disengagement of the front lid from the lower casing during the course of assembling.

In the other arrangement according to FIG. 7 the tip of the free end of the spring member is allowed to bite into the upper casing so as to prevent the disengagement of the front lid. This results in changes in the spring force due to the growing bite into the casing of the free end of the spring with repeated swing of the front lid after the assembling. Also, scratch of the casing with the increasing depth of bite can produce a dropout problem.

BRIEF SUMMARY OF THE INVENTION

The present invention solves the afore-described problems by forming a rib for front lid retention at the front of the upper casing of a tape cassette in which the free end of a spring member for the casing is fitted, and also by forming a bend at the free end of the spring member.

The invention will now be set out in more detail. It provides a tape cassette comprising a housing made up of upper and lower half casings, a pair of reels around which a tape is wound and contained altogether in the housing, said housing having openings formed at the front so that the tape supplied from one of the reels is exposed from the housing, pulled along the front and taken up by the other reel, a front lid swingably attached to the housing to cover its front surface, and a spring member having a coiled portion fitted onto a pivot of the front lid and also having a free end secured to the inner surface of the upper casing to force the front lid in the closing direction by the spring action, characterized in that a bend 26 angled toward a direction away from the inner surface of the upper casing is formed at the free end of the spring member that applies the spring action to the front lid and a rib 32 adapted to secure the free end of the spring member in place is formed at the front of the upper casing to which the front lid is attached.

Preferably, the front side of the rib is sloped and the inner surface side of the rib is substantially vertical. Thus, when the front lid is combined with and temporarily attached to the upper casing, the spring member is smoothly guided along the slope and easily fitted in place. When the upper casing with the temporarily attached front lid is joined to the lower casing, the spring member which otherwise would be moved out of place by forces applicable to the front lid is kept in place in engagement with the rib, whereby both the spring member and the front lid are protected from coming off from the upper casing.

BRIEF EXPLANATION OF THE DRAWINGS

FIG. 5(a) is a sectional view taken along the line A—A of FIG. 4, and (b) is a sectional view taken along the line A—A of FIG. 4, with the front lid swung open;

FIG. 6 illustrates a structure of the prior art, (a) being a sectional view of an upper casing combined with a front lid corresponding to the sectional view taken along the line A—A of FIG. 4 and (b), a similar sectional view with the front lid swung open; and FIG. 7 illustrates another structure of the prior art, (a) being a sectional view of an upper casing combined with a front lid corresponding to the sectional view taken along the line A—A of FIG. 4 and (b), a similar sectional view with the front lid swung open.

DETAILED DESCRIPTION OF THE PREFERRED EMBODIMENT

The present invention will now be described in detail with reference to the accompanying drawings.

Figure 1:
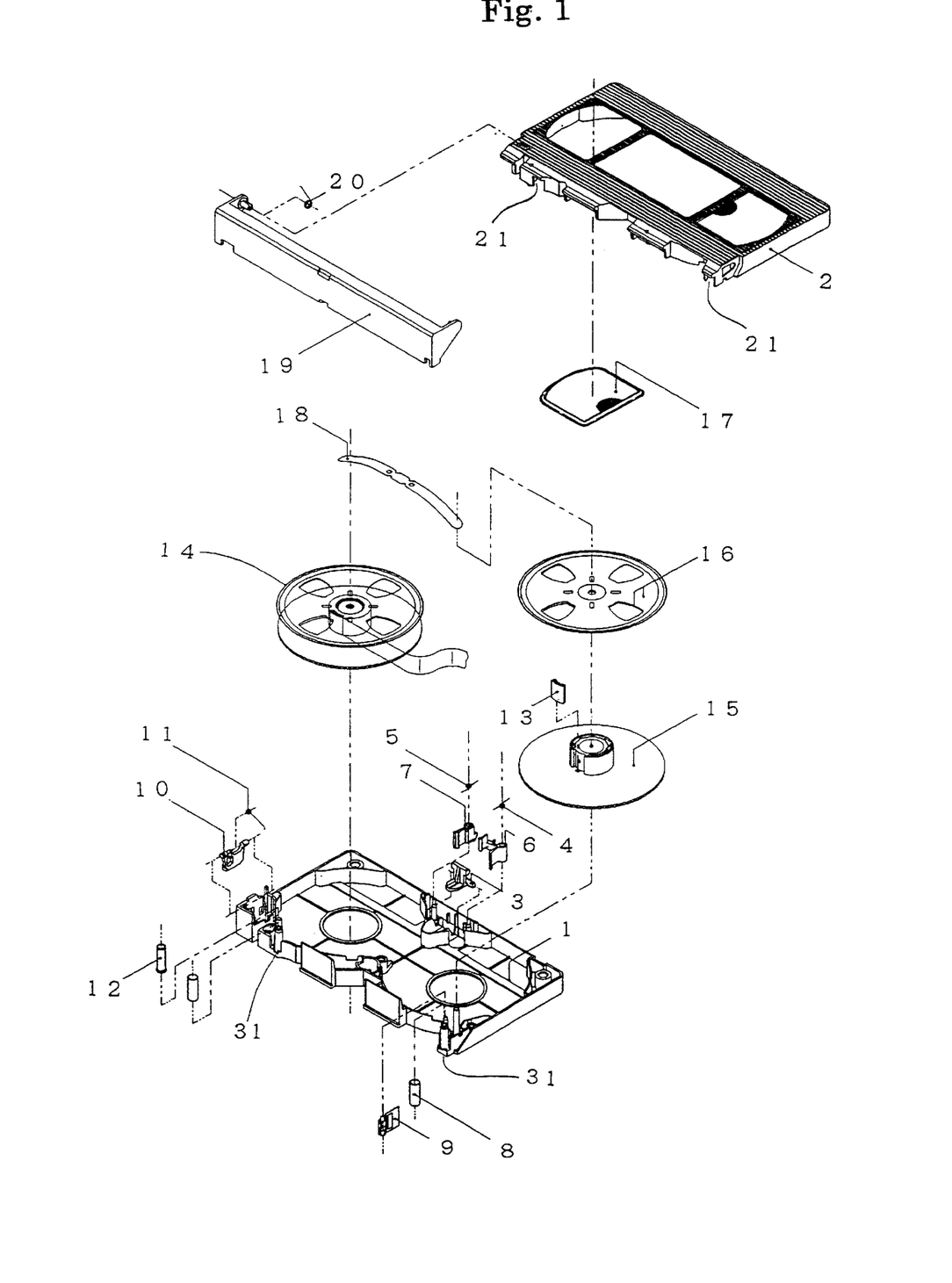
FIG. 1 is an exploded view of an embodiment of the present invention.

FIG. 1 is an exploded view of a video cassette of the VHS format embodying the invention.

A cassette housing made up of upper and lower half casings 2, 1 turnably contains a pair of reels 14 around which a tape is wound. At the front of the upper and lower casings 2, 1 there are openings 21, 31 so formed as to expose part of the tape, and a front lid 19 to cover the tape portion at the front when the cassette is not in use is fitted swingably with the housing. In the rear center of the housing are disposed detents 6, 7 to keep the reels 14 unmovable when the cassette is not used. Numerals of other components not concerned with the essential parts of the present invention designate: 3, detent release lever; 4, 5, springs combined with the detents 6, 7; 8, 12, tape guide pins; 9, tape pad; 10, front lid lock plate; 11, spring for the lock plate 10; 13, tape clamp; 15, lower flange with a hub for the reel 14; 16, upper flange; 17, clear window panel; and 18, reel-retaining spring.

Figure 2:
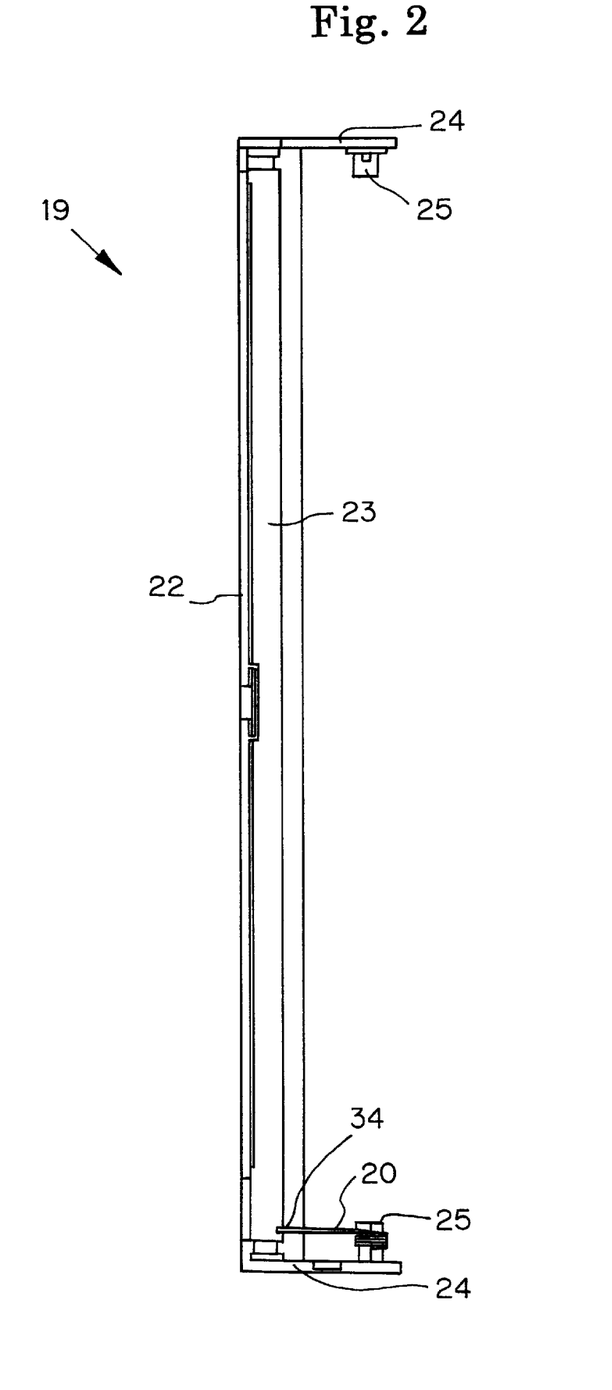
FIG. 2 is a plan view of a front lid fitted with a spring member.

As shown in FIG. 2, the front lid 19 is generally L-shaped, consisting of a top strip 23 and a front strip 22, with sidewalls 24, 24 on both sides. The sidewalls 24 are provided with pivots 25, one for each. A coiled portion 33 of a spring member 20 is secured to one of the pivots 25, and the free end 34 of the spring member 20 is hooked on the inside of the top strip 23 of the front lid 19.

Figure 3:
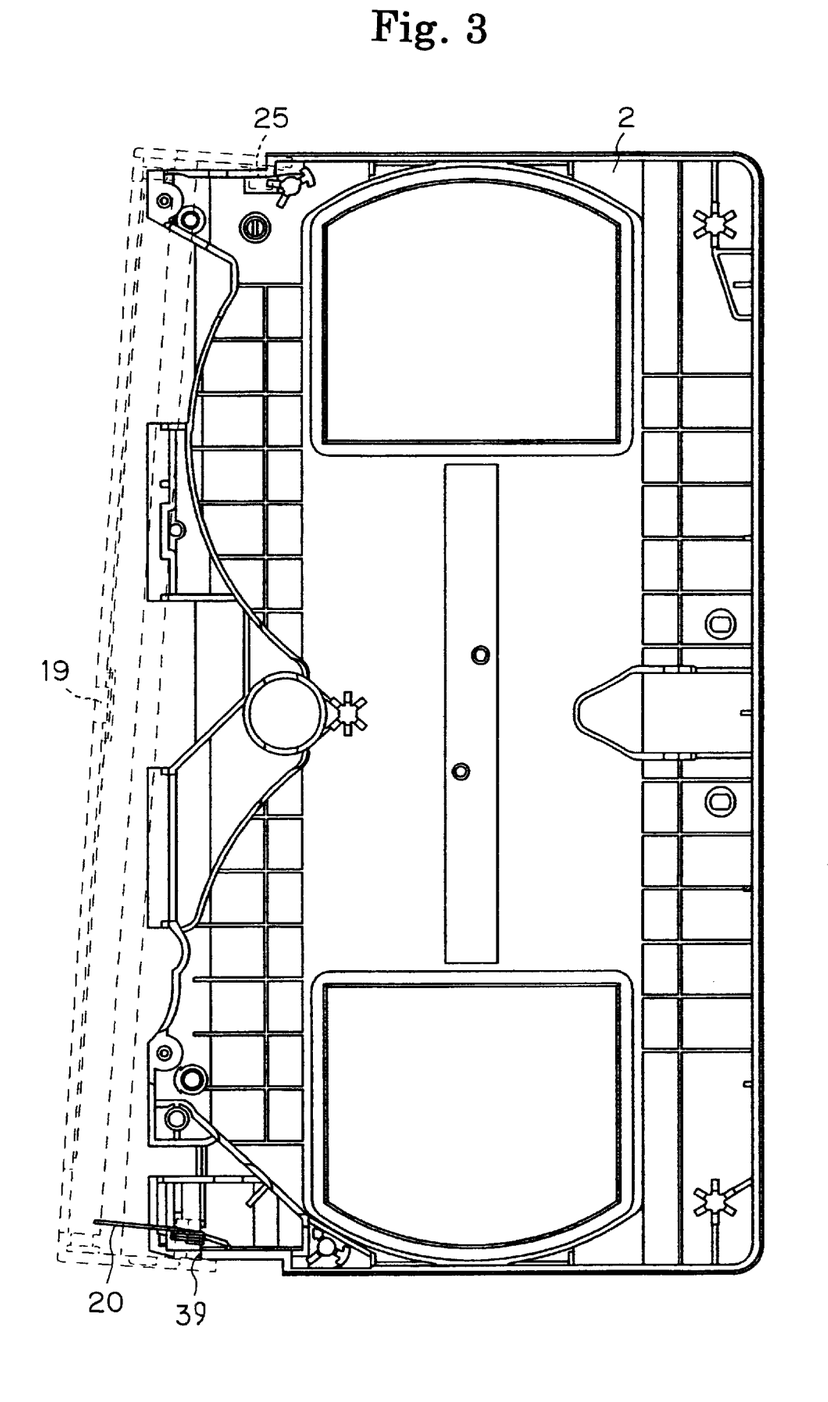
FIG. 3 is a plan view of an upper casing in the course of being combined with a front lid.
Figure 4:
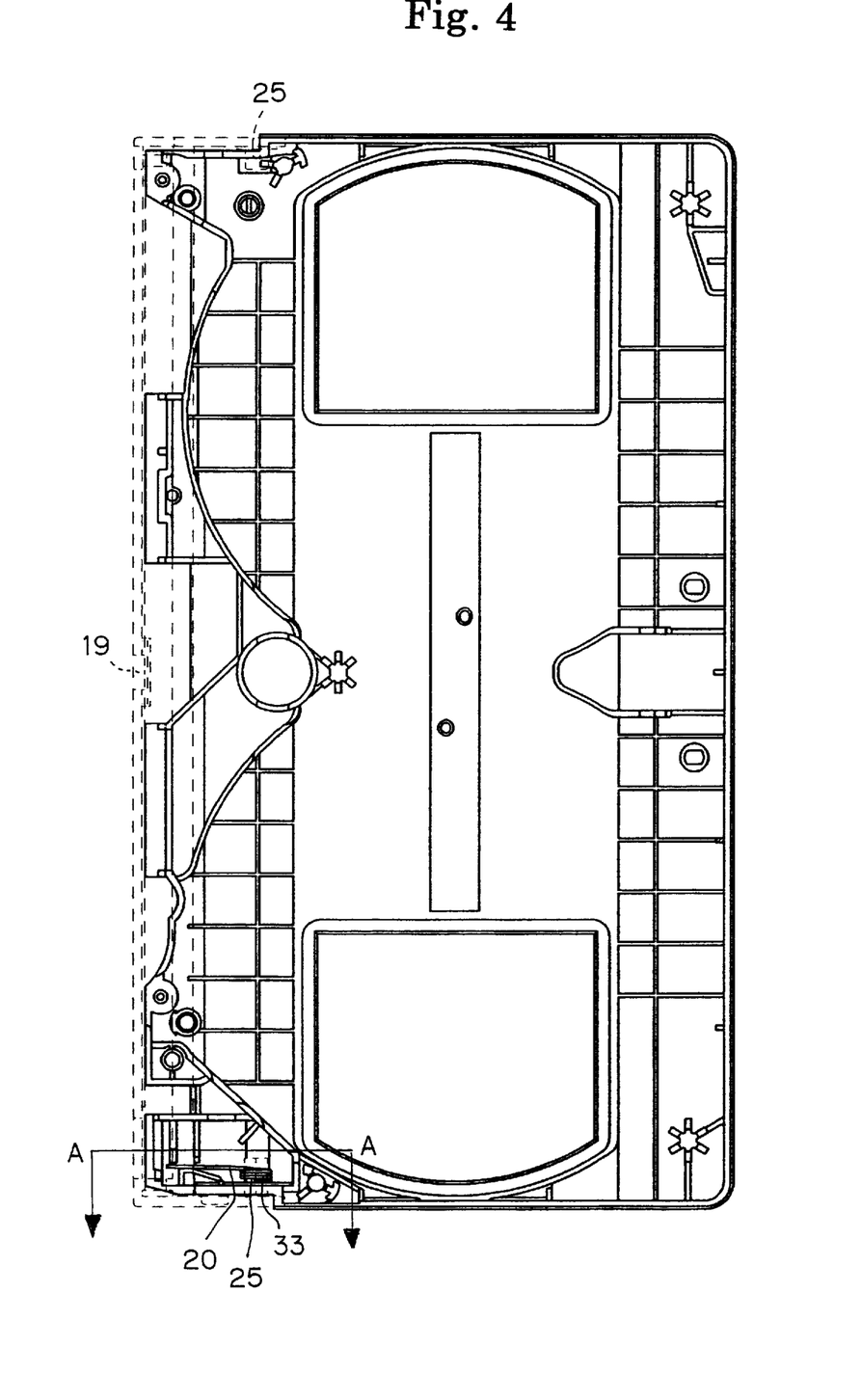
FIG. 4 is a plan view of an upper casing combined with a front lid.

When the front lid 19 thus fitted with the spring member 20 is to be set in the upper casing 2, as shown in FIG. 3, the pivot 25 at the end where it is not loaded with the spring member 20 is first fitted to the upper casing 2. At this point the front lid 19 is slanted with respect to the upper casing 2. The front lid 19 is then turned about the pivot 25 already fitted to the upper casing 2, to the position shown in FIG. 4. Next, the top wall 35 of the upper casing 2 is forced to slide into the space between the spring-loaded pivot 25 and the leg 34 at the free end of the spring member, and both pivots 25 are brought into contact with retaining ribs 39. The leg 34 of the spring member 20 that had been caught in the top strip 23 is thus engaged with the recess 36 of the upper casing 2.

Figure 5:
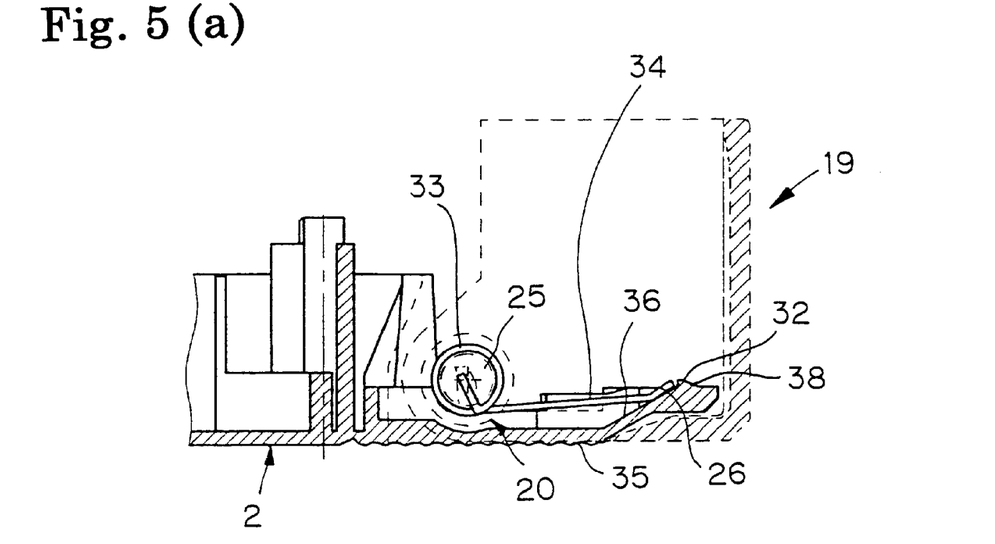

FIG. 5(a) shows the arrangement in the state just described above. The leg 34 at the free end of the spring member 20 has a bend 26 angled away from the inner wall surface of the upper casing 2. The bend is intended to prevent the free end of the spring member from scratching the upper casing or being hooked by the same during the course of assembling. The upper casing 2 has retaining ribs 39 (FIG. 3) for positioning the pivots 25, formed on the inner side (underside) of the front top wall 35 of the casing. The retaining ribs 39 are adapted to be combined with corresponding retaining ribs of the lower casing to provide bearings for turnably supporting the pivots 25. Also a frontwardly sloped recess 36 is formed on the inner side (underside) of the front top wall 35 to receive the leg 34 at the free end of the spring member 20. A stop rib 32 for keeping the free end 34 of the spring member 20 in place is formed in a frontal portion of the upper casing 2 that faces the free end of the spring member. The portion ahead of the stop rib 32 has a slope 38 which facilitates sliding of the spring member 20 when the front lid 19 is attached to the upper casing 2.

Next, the upper casing 2 with the front lid 19 attached as shown in FIG. 5(a) is joined, upside down, to the lower casing 1 in which reels 14 and other components have been assembled. During the joining work the front lid 19 must be kept swung to the open position in FIG. 5(b) so as to avoid its interruption with the tape inside the lower casing. At this point the pivots 25 are not secured in position yet and, depending on the direction in which external force is applied to the front lid, the front end of the leg of the spring member 20 would move, if the pivots 25 could be kept in normal position, in such a manner that the free end 34 of the spring member 20 is drawn inwardly of the housing as the front lid 19 swings. As the upper casing with the front lid is brought closer to the lower casing for joining, the bend 26 formed at the free end of the spring member 20 can slide upwardly along the slope at the front of the recess 36 depending upon the direction of externally applied force which is not always constant. However, owing to the presence of the stop rib 32, the spring member 20 is brought to a stop and there is no danger of the front lid coming off from the upper casing. In the state described, the upper casing 2 is fitted onto the lower casing 1. Removal of the force that keeps the front lid 19 open naturally enables the lid to return to the closed position under the urging of the spring member 20 as in FIG. 5(a).

The invention improves the efficiency of assembling a tape cassette by preventing the disengagement of the front lid from the housing during assembling work. It also precludes malfunction of the assembled cassette or scratching of the housing.

What is claimed is:

1. In a tape cassette comprising a housing made up of upper and lower half casings, a pair of reels around which a tape is wound and contained altogether in the housing, said housing having openings formed at the front so that the tape supplied from one of the reels is exposed from the housing, pulled along the front and taken up by the other reel, a front lid swingably attached to the housing to cover the front surface thereof, and a spring member having a coiled portion fitted onto a pivot of the front lid and a leg extending from said coiled portion having a free end engaged with the inner surface of the upper casing to force the front lid in the closing direction by a spring action, the improvement which comprises a bend formed at the free end of the leg of said spring member that applies the spring action to the front lid, said bend being angled with respect to said leg and extending along a sloped recess of the inner surface of the upper casing, and a rib formed at the front end of said sloped recess to which the front lid is attached, said rib being adapted to stop forward movement of the free end of the spring member, and the free end of the spring being spaced from said rib when the tape cassette is in a final state of assembly.

2. The tape cassette according to claim 1, wherein the rib is substantially vertical at the front end of said sloped recess and then sloped downwardly and frontwardly away from the top of said rib.

* * * * *